Sept. 13, 1938. D. O. C. DECKERT Re. 20,854

METHOD FOR MAKING SANCTUARY CANDLES

Original Filed Dec. 18, 1936 2 Sheets-Sheet 1

Inventor
Danvers O. C. Deckert
by Pippey & Cassidy
His Attorneys.

Sept. 13, 1938. D. O. C. DECKERT Re. 20,854

METHOD FOR MAKING SANCTUARY CANDLES

Original Filed Dec. 18, 1936 2 Sheets-Sheet 2

Inventor
Danvers O.C. Deckert
by Rippey & Hennig
His Attorneys.

Reissued Sept. 13, 1938

Re. 20,854

UNITED STATES PATENT OFFICE 20,854

METHOD FOR MAKING SANCTUARY CANDLES

Danvers O. C. Deckert, University City, Mo.

Original No. 2,103,237, dated December 28, 1937, Serial No. 116,475, December 18, 1936. Application for reissue March 12, 1938, Serial No. 196,756

3 Claims. (Cl. 18—58)

The invention relates to sanctuary candles.

An object of this invention is to provide a long burning sanctuary candle which will have a flame of uniform intensity so constructed and arranged that the entire fuel body will be consumed.

Heretofore sanctuary candles have been cast in containers but they have been arranged so that a well is sometimes formed in the fuel body around the wick during the burning of the candle, and after a well is so formed upon a sudden rise of temperature the sides of the well collapse causing the melted fuel at the center to rise and extinguish the flame.

Another object of the invention is to provide means whereby a sanctuary candle may successfully use a fuel stock of low melting point.

Another object of the invention is to provide a method and apparatus for forming a cone or mound at the top of a fuel body of a candle when cast in a transparent casing.

Other advantages not mentioned are inherent in the invention, some of which will be obvious from the following detail description taken in connection with the accompanying drawings.

Figure 1:
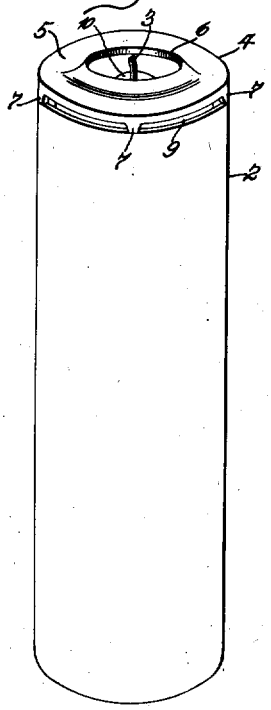
Fig. 1 is a perspective view of a candle embodying the invention and made in accordance therewith.
Figure 2:
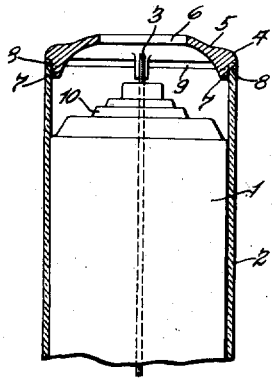
Fig. 2 is a sectional view showing the candle.
Figure 7:
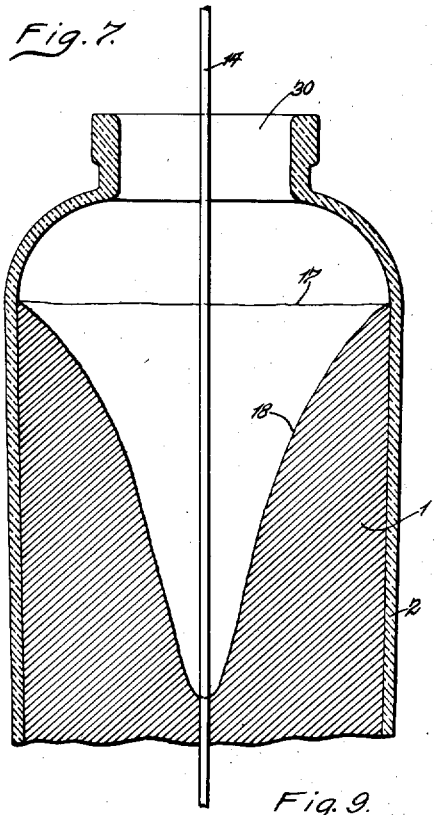
Figs. 7, 8 and 9 illustrate successive steps respectively in molding the candle within a casing having a restricted mouth.
Figure 8:
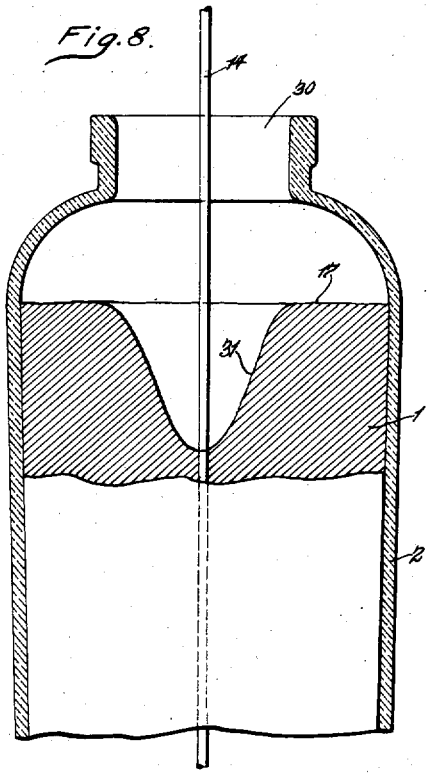
Figure 9:
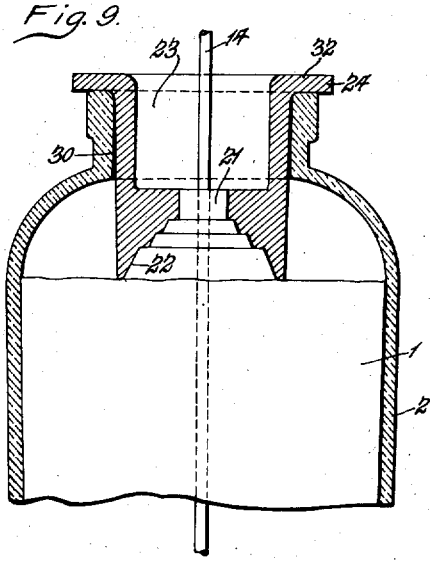

A candle made in accordance with this invention includes a fuel body 1 enclosed with a casing 2. The casing is a wide mouthed container having integrally a bottom and a cylindrical wall. The casting need not be a true cylinder. It may be such as shown in embodiment in Figs. 1 and 2, or it may be substantially modified by having inclined walls and a restricted mouth as shown in Figs. 7, 8 and 9. It will be understood, therefore, that the word cylindrical, as used herein, does not necessarily mean a true cylinder but refers to a construction having functions and structure like a cylinder.

The casing is preferably of clear glass although obviously a synthetic organic plastic could be used successfully. The fuel body may be ordinary candle wax; any wax of low melting point obtainable on the market as such being suitable.

The candle is provided with a wick 3 extending vertically and centrally disposed through the fuel body.

In burning the candle a cap 4 is used; this cap having an annulus 5 which may be substantially of the same diameter as the outer diameter of the casing 2 and whose central opening 6 forms a flue for the exit of gases of combustion and the heated air within the casing. The annulus 5 carries a series (four in number as actually shown on the drawings) of downwardly extending lugs 7 having notches 8, each of which presents a horizontal edge to contact and rest upon the top edge of the walls of the container 2, and a vertical edge which contacts the inner surface of the casing. Thus the cap is held in place and the annulus is spaced above the top of the container, to provide a substantially uniform opening 9 through which currents of fresh air may pass into the candle casing to support combustion.

The fuel body has a cone or mound 10 at its top, which as specifically shown in the drawings comprises a series of cylinders or cones of lessening diameter superimposed upon each other, the process in the formation of which will be described in detail later in this specification.

Figure 3:
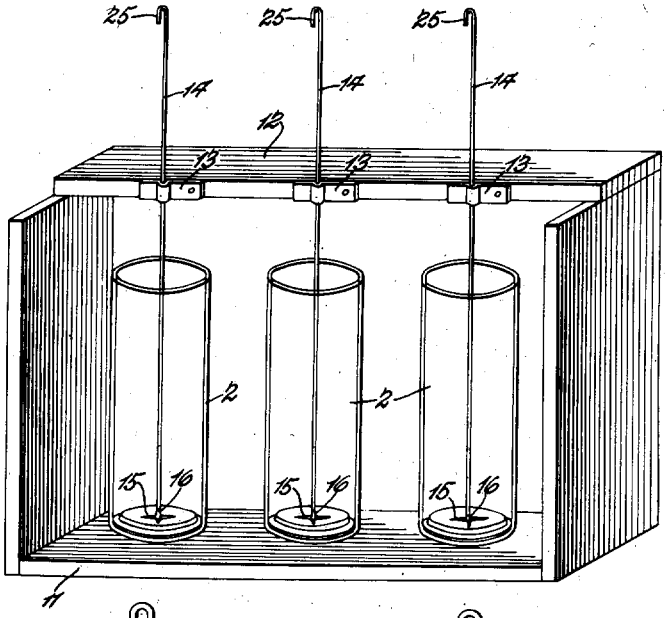
Fig. 3 is a view of apparatus used in manufacturing the candle.

A simple apparatus or frame for casting the candle is shown in Fig. 3. A base 11 serves as a support for containers 2 while a framework 12 carries clips 13 adapted to engage core rods or wires 14, sometimes referred to as "dummy wicks". The bottom of the rod 14 is placed in a plate or spacer 15 which may be of wood or, as specifically shown in the drawings, of sheet metal, convex in form and having a hole centrally therethrough and upwardly extending fingers 16. It will be understood that after the fuel body is cast the rod 14 is withdrawn and a true wick, stiffened in any acceptable manner already known in the art, will be inserted through the hole in the wax left by the withdrawal of the rod or wire. The apparatus illustrated in Fig. 3 is shown as adapted to accommodate three containers, but it will be understood this small number is merely shown as a matter of convenience, and that in actual practice such a device will accommodate many times this number for economy in manufacture. After the containers with the core rods 14 are in place, as shown in Fig. 3, molten candle wax is poured into the container to a point approximately as indicated by the numeral 17 on Fig. 5. The wax is then allowed to cool and in cooling will shrink forming a cavity as shown by the line 18 in Fig. 5. A mold member 19 is then inserted in the top of the casing 2, as shown in Fig. 6. This mold member comprises a circular body 20 having a central orifice 21 through which the second pouring of wax may be made. The inner surface of the body 20 has a conical cavity 22 which, as specifically shown, comprises a series of cylindrical or conical sections decreasing in diameter. The upper surface of the mold member has a cavity 23 providing a sprue about the orifice 21. A circumferential flange 24 about the body 20 is such that when the body portion sits inside the top of the casing 2 the circumferential flange 24 extends outwardly beyond the edge of the casing and provides means for handling the mold member.

The line 17 is so fixed that the bottom edge of the body 20 will contact the surface of the wax when the mold member is inserted. The cavity to be filled is bounded on its upper side by the wall of the conical cavity 22.

A second pouring of molten wax is made through the orifice 21 so that the wax projects upwardly and fills the inner cavity 22 of the mold member as well as the orifice 21 and preferably, to allow for the shrinkage, the top cavity or sprue 23 in the mold member. After the second pouring has been allowed to harden the wax is scraped out of the cavity 23 by an instrument such as a putty knife, and the mold member 19 is lifted from the casing. Because of the uncertainties in the manufacture of glass containers the diameter of the body portion 20 must be made slightly smaller than the usual inner diameter of the castings, to provide for ready insertion and removal, and to provide for tolerances in glass manufacture.

While but two pourings have been illustrated and described, ordinarily depending upon the size and proportions of the casing, an intermediate pouring is required or is desirable before the mold member is inserted. This is illustrated and described specifically in connection with Figs. 7, 8 and 9.

It will be understood that during the first and second pouring of wax the core rod 14 will be in place, as shown in Fig. 3. The clips 13 are so arranged that after the wax has been hardened subsequent to the first pouring the core rod may be removed from the clip 13 and the core member 19 will be placed in position by passing the rod through the orifice 21.

After the wax has hardened subsequent to the second pouring the core rod 14 is withdrawn. A hook 25 is formed in the upper end of the rod 14 to facilitate its manipulation. The wick 3, which is of stiff material, is inserted into the candle through the hole made by the removal of the core rod 14 and the candle thus is completed.

Figure 5:
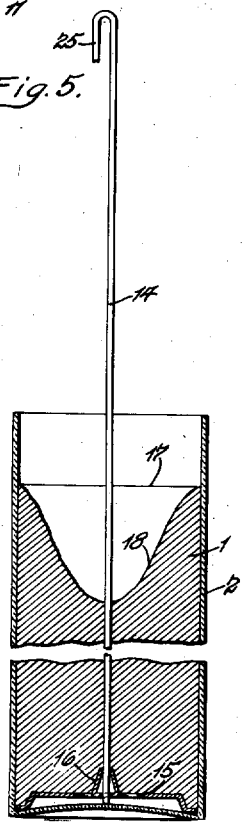
Fig. 5 is a sectional view of the candle at one step of its manufacture.
Figure 6:
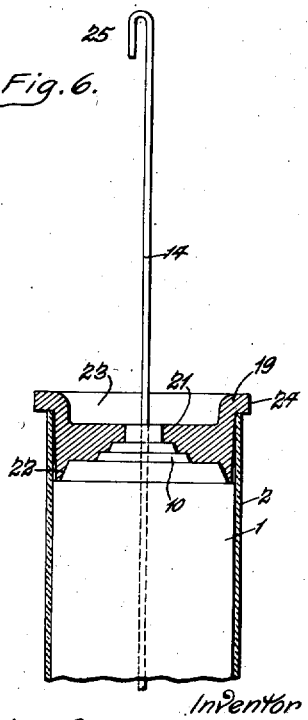
Fig. 6 is a sectional view similar to Fig. 5 at another step in the manufacture.
Figure 4:
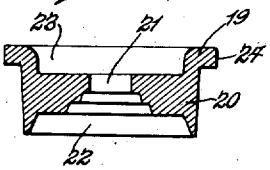
Fig. 4 is a vertical section through the center of a mold member.

It has been pointed out that the wax is not filled to the very top of the casing, but to a line 17, as heretofore mentioned and as shown in Fig. 5. It is recommended that this be between three-fourths to one inch from the top. In extreme hot weather the wax body will expand and unless this space is left the wax will expand over the top of the casing wall.

The cone or mound 10 at the top of the wax body has been described in detail. The purpose of this cone is to prevent a well forming in the fuel body, leaving above the wick upwardly extending walls, which by suddenly melting or caving may extinguish the flame. With the mound or cone 10 a reduced fuel body is provided when the candle is lighted and until it is uniformly heated. After the burning has progressed to a considerable extent the entire top of the fuel body will become liquid so that the formation of a well and the accidental extinguishing of the flame is prevented.

The arrangement of the cap 4 with a central flue and a substantially uniform opening about the top of the casing is such as to provide a flickerless and sootless flame and one which is uniform throughout the burning. The outside air to support combustion will enter through the space 9 between the annulus 5 and the top of the casing and flow downwardly in the form of a cylinder toward the flame, while the gases of combustion and the heated air will flow upwardly at the center and outwardly through the flue or central orifice 6 in the cap.

Figs. 7, 8 and 9 illustrate an embodiment of the invention in a container having a restricted mouth. These figures also illustrate an intermediate pouring between the initial pouring and the final one. In this case the container 2 has a restricted mouth 30. Molten wax is poured into the container to a line 17 and upon cooling a cavity 18 will be left. The line 17 must be substantially below the mouth of the container in order to allow expansion of the fuel body in hot weather. After the initial mass of wax has been cooled, wax is again poured into the container to the line 17 and shrinkage will leave a cavity indicated by the numeral 31, Fig. 8. A mold piece 32 is then inserted in the neck of the container until the bottom contacts the top of the body of wax.

The mold piece 32 is similar to the mold piece 19 except that it is more elongated in form. It has a central orifice 21, a bottom cavity 22 and a top cavity or sprue 23.

It has been found that a candle in combination with the cap, as herein described, provides a long burning device with a flame of constant luminosity which will not be accidentally extinguished under any ordinary conditions. A flickerless and sootless flame is produced with a minimum or practically no fire hazard. The method and mold piece provide efficiently for the manufacture of the device.

Various changes may be made in the details of construction, within the scope of the appended claims, without departing from the scope of this invention, while parts of the invention may be used to advantage without the whole.

I claim:

1. The method of making a candle having a permanent casing comprising, flowing molten material into the casing about a central core, allowing said material to harden against the walls of the casing, placing a mold piece within the top of the casing and around the core, and flowing molten material against the top of the hardened material through a central cavity in the mold piece and about the central core to fill such cavity and form a mound on the material body.

2. The method of making a candle having a permanent casing comprising, flowing molten material into the casing, allowing said material to harden against the walls of the casing, placing a mold piece within the top of the casing, and flowing molten material through a central cavity in the mold piece into a space between the top of the hardened material and the underside of the mold piece and filling said cavity to form a mound.

3. The method of making a candle having a permanent casing comprising, flowing molten material into the casing, allowing said material to harden against the walls of the casing, leaving through shrinkage a central cavity, flowing additional molten material into said cavity, allowing said second flowing to harden, placing a mold piece within the top of the casing, and flowing molten material against the top of the hardened material through a central cavity in the mold piece to fill said cavity and form a mound on the material body.

DANVERS O. C. DECKERT.